US010866719B1

(12) United States Patent
Bulusu et al.

(10) Patent No.: US 10,866,719 B1
(45) Date of Patent: Dec. 15, 2020

(54) CONTENT-SPECIFIC AUTO-SCROLLING DEVICES AND METHODS

(71) Applicant: Amazon Technologies, Inc., Seattle, WA (US)

(72) Inventors: Prakash Bulusu, Bangalore (IN); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 568 days.

(21) Appl. No.: 15/363,321

(22) Filed: Nov. 29, 2016

(51) Int. Cl.
*G06F 3/0485* (2013.01)
*H04L 29/08* (2006.01)
*H04L 12/58* (2006.01)

(52) U.S. Cl.
CPC ............ *G06F 3/0485* (2013.01); *H04L 51/32* (2013.01); *H04L 67/306* (2013.01)

(58) Field of Classification Search
CPC . G06F 3/0485; G06F 3/04883; H04L 67/306; H04L 51/32
See application file for complete search history.

(56) References Cited

U.S. PATENT DOCUMENTS

| | | | | |
|---|---|---|---|---|
| 4,647,916 A * | 3/1987 | Boughton | ............ | G06F 3/0338 345/156 |
| 6,157,381 A * | 12/2000 | Bates | ................ | G06F 3/04855 345/684 |
| 6,462,752 B1 * | 10/2002 | Ma | ........................ | G06F 3/0485 345/684 |
| 6,515,656 B1 * | 2/2003 | Wittenburg | ............ | G06F 3/0485 345/418 |
| 8,073,850 B1 * | 12/2011 | Hubbard | ................ | G06Q 30/02 707/736 |
| 8,438,496 B1 * | 5/2013 | Hegde | ................... | G06F 3/0485 715/784 |
| 8,504,940 B1 * | 8/2013 | Fioravanti | ............. | G06F 3/0485 345/473 |
| 9,772,979 B1 * | 9/2017 | Young | ................. | G06F 16/9574 |
| 10,012,490 B1 * | 7/2018 | Pilarinos | ............... | G06F 1/3206 |
| 2002/0126154 A1 * | 9/2002 | Watson | ................. | G06F 3/0485 715/784 |
| 2002/0130891 A1 * | 9/2002 | Singer | .................. | G06F 3/0485 345/684 |

(Continued)

*Primary Examiner* — Stella Higgs
(74) *Attorney, Agent, or Firm* — Eversheds Sutherland (US) LLP

(57) ABSTRACT

Systems, methods, and computer-readable media are disclosed for auto-scrolling devices and methods. In one embodiment, an example method may include determining a content feed that includes first content and second content for presentation at a user device, and determining a first relevance value for the first content. Example methods may include determining that the first content is relevant to a user account associated with a user of the user device based at least in part on the first relevance value, determining a second relevance value for the second content, and determining that the second content is irrelevant based at least in part on the second relevance value. Example methods may include determining a first scroll speed to scroll through the content feed when the first content is presented by the user device, and determining a second scroll speed to scroll through the content feed when the second content is presented.

18 Claims, 6 Drawing Sheets

(56) References Cited

U.S. PATENT DOCUMENTS

| | | | |
|---|---|---|---|
| 2006/0248470 A1* | 11/2006 | Lee | H04N 5/44543 715/784 |
| 2007/0073641 A1* | 3/2007 | Perry | G06F 16/335 |
| 2008/0079972 A1* | 4/2008 | Goodwin | G06F 3/0485 358/1.12 |
| 2008/0092078 A1* | 4/2008 | Takeshima | G06F 3/0485 715/786 |
| 2008/0141126 A1* | 6/2008 | Johnson | G06F 17/212 715/273 |
| 2010/0199180 A1* | 8/2010 | Brichter | G06F 3/0482 715/702 |
| 2011/0213607 A1* | 9/2011 | Onishi | H04N 7/147 704/2 |
| 2012/0062604 A1* | 3/2012 | Lobo | G06F 3/0485 345/684 |
| 2012/0066638 A1* | 3/2012 | Ohri | G06F 3/0485 715/784 |
| 2012/0124475 A1* | 5/2012 | Foote | H04N 7/17318 715/719 |
| 2012/0174005 A1* | 7/2012 | Deutsch | G06F 3/04817 715/764 |
| 2013/0111396 A1* | 5/2013 | Brid | G06F 3/0485 715/784 |
| 2013/0232444 A1* | 9/2013 | Hegde | G06F 3/0485 715/785 |
| 2014/0380247 A1* | 12/2014 | Tecarro | G06F 3/0483 715/863 |
| 2015/0067557 A1* | 3/2015 | Lee | G06F 3/0487 715/765 |
| 2015/0074591 A1* | 3/2015 | Proctor | G06F 3/0485 715/784 |
| 2015/0089358 A1* | 3/2015 | Li | G06F 3/0485 715/273 |
| 2015/0100916 A1* | 4/2015 | Hanumara | G06F 3/0481 715/785 |
| 2016/0086219 A1* | 3/2016 | Richardson | G06F 16/9535 705/14.53 |
| 2016/0328108 A1* | 11/2016 | Li | G06F 3/0485 |
| 2017/0085854 A1* | 3/2017 | Furesjo | G10L 15/265 |
| 2017/0124083 A1* | 5/2017 | Li | G06F 16/24578 |
| 2017/0277415 A1* | 9/2017 | Kim | G06F 3/0482 |
| 2018/0024716 A1* | 1/2018 | Kim | G06F 3/0488 715/745 |

* cited by examiner

CONTENT-SPECIFIC AUTO-SCROLLING DEVICES AND METHODS

BACKGROUND

Digital content may be consumed on electronic devices. Display sizes, however, may limit an amount of content that can be presented to users of electronic devices at once. Users may therefore have to manipulate the electronic devices to consume content that is not currently presented at the display. For example, users may have to scroll downwards to read a portion of an article. Certain digital content may include a number of links, images, or other content that a user can peruse. For example, accessing a website on an electronic device may present the user with articles, images, videos, and other content that the user can scroll through or otherwise browse using the electronic device. Such interaction between electronic devices and users may be time consuming or cumbersome. Further, content that may be relevant or important to a user may not be presented or brought to the user's attention. Users may therefore desire to consume content in a less time consuming or less cumbersome manner, and may desire to consume relevant or important content.

Figure 1:
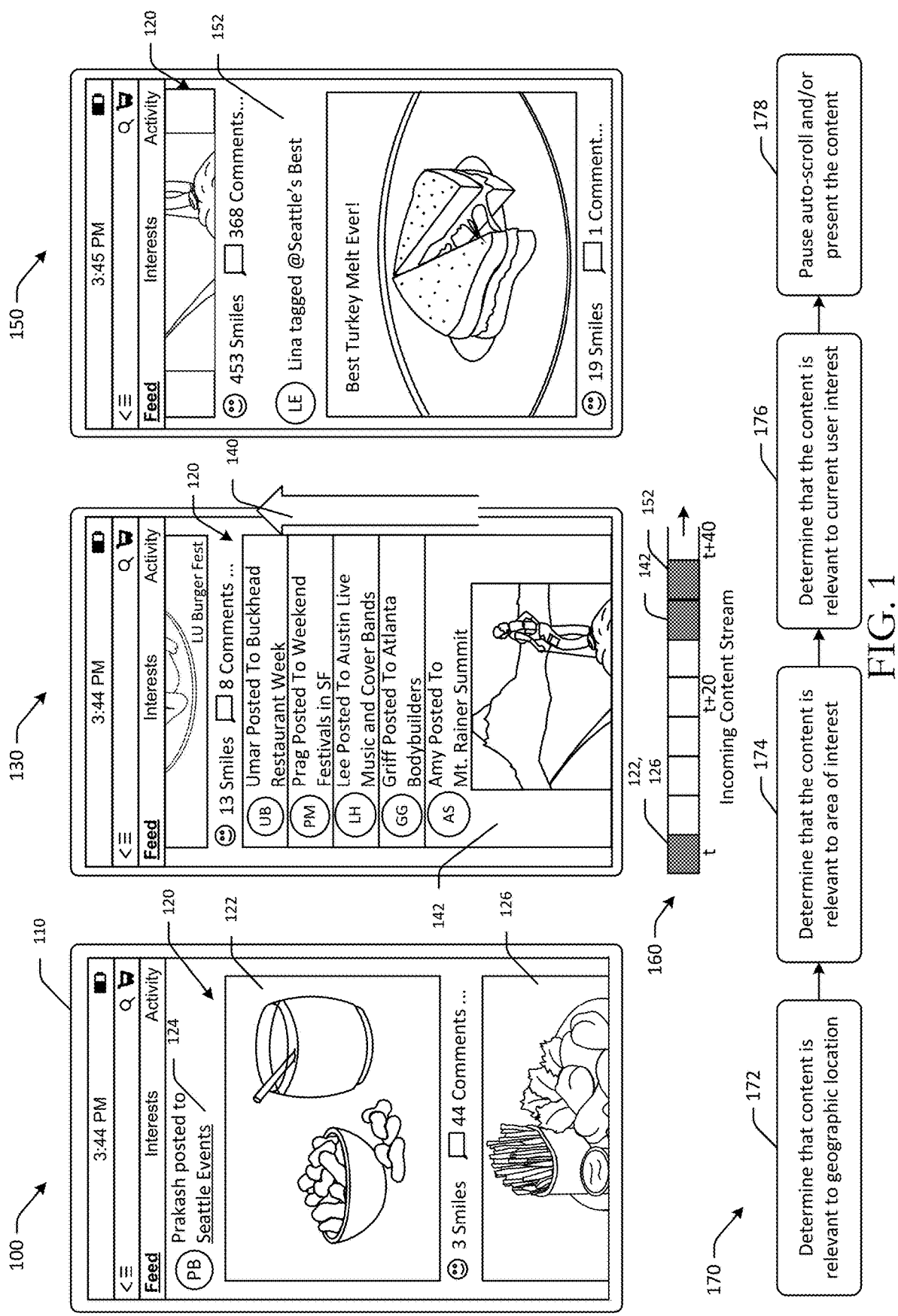
FIG. 1 is a hybrid system and process diagram illustrating a user-specific auto-scrolling device and method in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Electronic devices may be used to consume digital content, such as video, text, images, and other content. Digital content may be presented, for example, as websites, applications, user interfaces, and the like. Certain content may be presented in a content feed or a stream of content that may be updated over time with new posts or content. For example, social media applications or sites may include a content feed that includes content such as images, news, views, activities, event information, communications, stories, articles, user generated content (e.g., user thoughts, user "tweets," "posts," "snaps," or other content, sketches, images, etc.), text, videos, and other content. Content feeds may be updated with new posts or content periodically or in real-time. In some instances, content feeds may include personalized content for the user, such as content from a user's social network, content that a user may be interested in, and other personalized content. Content feeds may include search results, such as product search results, email inboxes, text message conversations, such as group chats, and other content.

Users may consume content and content feeds at electronic devices. For example, a user may swipe or perform another gesture or otherwise manually interact with a touchscreen of an electronic device to consume content in a content feed. However, content that may be important or relevant to the user may be buried in the content feed or may otherwise be difficult for the user to find. Such content may therefore be unconsumed by the user or may not be presented to the user for consumption. For example, if a content feed is arranged in a chronological order and updated in or near real-time, if highly relevant or important content to the user has been added to the content feed recently, and the user is consuming content from yesterday, the user may not reach the relevant or important content during a browsing session, and may therefore not be presented with the highly relevant or important content.

Embodiments of the disclosure may automatically scroll or otherwise navigate through content presented at electronic devices, thereby removing the need for users to manually interact with a device to navigate through a content feed. Certain embodiments may determine a relevance of particular content to a user of a device, and may use a relevance score or relevance metric to determine auto-scroll functionality, which may include one or more of an arrangement of content, such as an arrangement of content in a content feed, a presentation of time of certain content (e.g., how long certain content is presented on a display device, etc.), a scroll speed (e.g., how fast content in a content feed or other format is scrolled through, etc.), a swipe or gesture sensitivity (e.g., how much content is swiped or scrolled through in response to a gesture, such as a swipe or other gesture, etc.), and other features. Some embodiments may determine an importance score for content in addition to, or instead of, a relevance metric to determine auto-scroll functionality. Importance scores may be indicative of an information content or information content density of content. For example, if certain content has a relatively high importance score, the content may include important information. Importance of information may be determined based at least in part on one or more keywords found in the content, which may be event or content specific. For example, in content related to NBA basketball, content that includes a star player's name and the keyword "injury" may be determined to be relatively important. Other factors, such as content source, spelling and/or punctuation, user ratings (e.g., likes, shares, smiles, comments, etc.), and other factors may be used to determine importance. In another example, content with the keyword "comeback" may be determined to be important. In another example, content with profanity, incorrect spelling, or content that is poorly rated by other users may be determined to be relatively unimportant.

Some embodiments may highlight a theme-specific, user-specific and/or user-account specific, content-specific, and/or historical or current browse-specific set of content. For instance, users can speed-read through a book or other text, or get a flavor of the content in the book by auto-scrolling through salient pages that offer a glimpse of what's in the entire book or content.

Embodiments of the disclosure may therefore allow users to consume relevant and/or important content with reduced or no physical interaction with an electronic device. Certain embodiments may automatically navigate or scroll through content in a user-specific manner. Embodiments of the disclosure may determine relevant and/or important content and may pause or adjust presentation times for such content. Some embodiments may automatically scroll or navigate through content, while others may adjust device settings, such as swipe or gesture sensitivity and/or scroll speed to facilitate consumption of content.

This disclosure relates to, among other things, systems, methods, computer-readable media, techniques, and methodologies for user-specific auto-scrolling devices and methods. Embodiments may automatically scroll or navigate through content, such that a user can consume relevant and/or important content with little or no manual interaction with a device. Some embodiments may manipulate device settings to facilitate consumption of content. Content presentation time may be determined based at least in part on an incoming rate of new content added to a feed, a total amount of content that is available for presentation, a total number of relevant or important items, a user's reading speed, a user's current or historical interests, and other factors.

Referring to FIG. 1, a hybrid system and process diagram illustrating a user-specific auto-scrolling device and method in accordance with one or more embodiments of the disclosure is depicted. In the example of FIG. 1, a user device 110 may present content at a first user interface 110. The user device 110 may be in communication with one or more remote servers. A user may use the user device 110 to consume digital content. For example, the user may be consuming digital content presented in a content feed 120 at the first user interface 100. The content feed 120 may include content such as text, images, audio, videos, links, search results, emails, messages, and other content. The content feed 120 may be configured to show successive content, such as posts, stories, activities, events or other content in a stream of new posts. The content feed 120 may be arranged in a chronological order or any other order. The content feed 120 may include a stream of content and may be updated periodically, continuously, and/or in real-time with new content or posts.

Content may be posted to or added to the content feed 120 by other users, by a content provider, or by another entity. In some instances, such as during a popular event like the Super Bowl, content may rapidly accumulate in the content feed 120. As a result, it may be difficult for a user to consume content in the content feed 120. However, many of the pieces of content in the content feed 120 may have low information content or information content density, importance, and/or relevance to the particular user. Users may manually scroll or navigate through the content in the content feed 120 in order to consume the content, but may miss interesting and/or relevant content due to the volume or number of pieces of content in the content feed 120. For example, during the time it takes for the user to consume a post or other content, there can be many new posts, such as 30+ new posts, added to the content feed 120.

In the example of FIG. 1, the content feed 120 may include a first content post 122 that may include an image. The first content post 122 may be posted by a user, such as Prakash, and may be posted to a certain theme or category. For example, the first content post 122 may include an image of a drink and snacks and may be posted to a "Seattle Events" category 124 or section. The content feed 120 may include additional information associated with the first content post 122, such as a number of likes or smiles, a number of comments on the post, and the like. The content feed 120 may be a scrollable content feed for presentation at the touchscreen display of the user device. The content feed 120 may be scrollable in that the content feed 120 can be scrolled through or navigated through in at least one direction (e.g., top to bottom, etc.).

A user of the user device 110 may interact with one or more posts or content in the content feed 120. For example, the user may "like" or "smile" in response to a certain post or content. User interaction indicative of the user's feelings or current state of mind and/or interests may be used to determine the user's current interests. For example, the user may smile at the first content post 122. As a result, embodiments of the disclosure may identify other content that may be related to the first content post 122, because related content may be relevant to the user. For example, a second content post 126 may include information regarding or related to another event in the Seattle geographic area, or in some embodiments, a particular region of Seattle, such as Lake Union. The second content post 126 may include information such as an image posted to the category or event of "Lake Union Burger Fest." The Lake Union Burger Fest category may be a subcategory of "Seattle Events" 124. Content may be determined to be relevant based at least in part on a source or provider of the content (e.g., is the poster or source of the content the user's best friend? Is the poster associated with other content the user likes?, etc.), historical user interaction with content, user interaction with content during one or more browsing sessions, user attributes, historical user data, user preferences, and other information. In some embodiments, a first relevance value for the first content post may be determined. For example, the first relevance value may be determined using the user attributes and/or the historical user interaction data, such as the use's indication of a smile or a search query for Seattle events. The first content may be determined to be relevant content based at least in part on the first relevance value.

In FIG. 1, a user identifier of a user that is using the user device 110 may be determined. The user device 110 may include a touchscreen display. User attributes, such as user preferences, user characteristics, user demographics, purchase history, user reading speed (e.g., estimated or actual user reading speed, etc.), user browsing session length history (e.g., average length of browsing session for a particular app or device, etc.), user interaction history, user browsing history, and other user attributes of the user may be determined using the user identifier. For example, the user identifier may be associated with a user profile that includes the user attributes. User interaction data for the user may be determined using the user identifier. The user interaction data may be indicative of previous interactions between the user and content presented at the touchscreen display, such as the content feed 120. The user interactions may be comments, smiles, like, posts, search queries, event information, and other interactions that may be indicative of user preferences.

The second content post 126 may be determined to be relevant to the user based at least in part on the user's interaction with, or selection of a smile in this instance, the first content post 122. As a result, the second content post 126 may be presented at the user device 110. In some embodiments, the user device 110 and/or a remote server may determine whether content is relevant to the user, whether content includes important information, whether content has high or low information content density, and/or other metrics prior to determining whether to present the content and/or a presentation time, or a length of time in which to present the content. Important or relevant content may be presented for longer presentation times than, for example, unimportant or irrelevant content. In some embodiments, unimportant or irrelevant content may not be presented. The user may swipe and/or the user device 110 may detect a gesture, such as a swipe gesture at the touchscreen display, a motion gesture captured with a camera, an audible gesture captured via a microphone, or another gesture, to continue scrolling through the content feed 120.

At a second user interface 130, the content feed 120 may include a number of irrelevant posts or content. In some embodiments, content may be determined to be irrelevant if the content does not relate to the user's current or historical interests. Content that is irrelevant may not be presented or may not be presented in its entirety. In some embodiments, content that is irrelevant may be presented, but for a reduced presentation time, so as to allow a user to manually interact with the user device 110 to pause the content feed 120 in order to consume content that was determined to be irrelevant. For example, content such as content posted by strangers or users to whom the user has no affiliation, or content regarding events that are not related to a certain geographic area, or content that the user may not find interesting may be skipped over or partially presented. In FIG. 1, posts by Umar to Buckhead Restaurant Week, Prag to Weekend Festivals in SF, Lee to Austin Live Music and Cover Bands, and Griff to Atlanta Bodybuilders may be determined to be irrelevant to the user consuming the content feed 120. As a result, the posts may be partially presented or skipped over, so as to present subsequent relevant content. In some embodiments, such as the illustrated example, these posts may be auto-scrolled 140, or automatically scrolled past, so as to bring subsequent relevant content to the user's attention. The user may therefore not have to manually review and/or navigate past irrelevant posts. A second relevance value for the irrelevant content may be determined. The irrelevant content may be determined to be irrelevant content based at least in part on the respective relevance values. The first content post 122 and/or other relevant content may be presented for a first length of time, while irrelevant or less relevant content may be presented for a second length of time that is shorter than the first length of time.

Subsequent relevant content may include, for example, a third content post 142. The third content post 142 may be an image posted to "Mt. Rainer Summit" and may be posted by a user named Amy. Amy may or may not be associated with the user of the content feed 120. However, the image and/or the category of "Mt. Rainer Summit" may be related to "Seattle Events" or Seattle generally, and may therefore be determined to be relevant to the user.

At a third user interface 150, the content feed 120 may be automatically scrolled or navigated to a fourth content post 152, in which a user named Lina tagged @Seattle's Best with an image having a caption of "best turkey melt ever!" The fourth content post 152 may be determined to be relevant due to its relationship to Seattle, as well as due to its relationship to food in some embodiments. For example, if the user interacted with or indicated that the first content post 122 was of interest, the fourth content post 152 may be determined to be relevant not only because it is also related to an event in Seattle, but further because it is related to food, like the first content post 122. Accordingly, the fourth content post 152 may be presented at the user device 110 for consumption by the user.

As new content is added to the content feed 120, a determination may be made as to whether the new content is relevant to the user. For example, an incoming content stream 160 may be analyzed to determine which content is relevant to the user, and should therefore be presented, and which content should be skipped and/or scrolled past. At a first point in time t=0, it may be determined that the first content post 122 and the second content post 126 are relevant and should be presented. Subsequent content may be skipped while the user consumes the first content post 122 and/or the second content post 126. Shortly after t=20, it may be determined that the third content post 142 and the fourth content post 152 are relevant to the user and should therefore be presented. As a result, the user may be able to consume relevant, interesting, important, and/or informational content in the content feed 120 without having to manually navigate through the content feed 120, or with a reduced amount of interaction with the content feed 120. Relatively less important and/or relatively less relevant content may be skipped or filtered out of the content feed 120 based at least in part on a user's current or historical interests and interactions with the content feed. As new content is posted that aligns with a user's current interest, that content may be added to the content feed 120 as the incoming content stream 160 continues. The incoming content stream 160 may continue until the end of a browsing session or may continue until a subsequent browsing session.

Certain embodiments may implement a process flow 170 to auto-scroll or auto-navigate through content in accordance with one or more embodiments of the disclosure. The process flow 170 may include a first operation 172, at which it is determined that content is relevant to a particular geographic location. For example, content may be relevant to a user if the content is relevant to a particular geographic location that may or may not correspond to a geographic location of a user device. For example, in FIG. 1, content pertaining to Seattle may be determined to be relevant, as the user may be interested in events occurring in Seattle.

At a second operation 174, it is determined that the content is relevant to an area of interest. An area of interest may be a subarea of the geographic location. For example, if the geographic location is Seattle, the area of interest may be Lake Union, a particular venue, a particular event, or another area of interest. If a post has content that is not relevant to the area of interest, the post may not be presented.

At a third operation 176, it is determined that the content is relevant to a current user interest. For example, if the user is searching for events in Seattle, things to do, places to eat, etc., and the content is related to a burger festival, the content may be related to a current user interest.

At a fourth operation 178, the content may be presented and/or scrolling of the content feed may be paused. The user may consume the content. In some embodiments, the content may be presented while the content feed continues to scroll or move at a relatively slower speed, thereby providing the user additional time to consume the content.

In some embodiments, metrics such as importance, information content density, and other metrics may be used to sort or filter through content for presentation as content is added to the content feed. Importance may be determined by one or more keywords in the content, a source of the content, user interaction with the content (e.g., a number of likes or smiles, a number of comments, etc.), and the like. Information content density may be determined by a number of keywords appearing in the content, a length of the content, and the like.

Accordingly, embodiments of the disclosure may seamlessly browse content, such as a list of items (e.g., recommendations, movies, songs, album covers, posts, activities, stories, updates, news, messages, browsed products, TV listings, emails, tweets, playlists, etc.) by automatically scrolling through content, slowing down for relevant items, and stopping at particularly important or relevant items or content. Using embodiments of the disclosure, users can stop, rewind, or fast-forward the auto-scroll process. Auto-scroll parameters such as scroll speed and variability may be personalized for users and can be manually adjusted. Users can increase scroll speed by swiping again or by swiping faster in the direction of auto-scrolling in some embodiments, while in other embodiments, scroll speed can be reduced by swiping against the direction of auto-scroll. Auto-scroll can be stopped or paused by tapping on an item.

Certain embodiments of the disclosure may be applied to scroll or navigate through content in different formats, such as content presented in a carousel format (e.g., carousel presentation of product listings, media, and other content, etc.). Scroll or navigation speed through content may be dynamic based at least in part on relevance of the content, as opposed to constant speed. Scroll speed may be variable and may be specific to the user and based at least in part on relevance of content and, in some instances, user reading speed. Scroll speed may be determined based at least in part on device characteristics. For example, devices with relatively large displays, such as tablets, may have smaller changes in scroll speed than devices with relatively smaller displays, such as smartphones. Device characteristics such as display size, form factor, orientation (e.g., portrait vs. landscape), aspect ratio, and other characteristics may be used to determine scroll speed, gesture sensitivity, and/or presentation times for certain content.

Embodiments of the disclosure may be used in conjunction with voice-based functionality. For example, a user can issue a search query in speech/voice, and the results can be played out to the user in a serial and automatic manner. For example, after a user prompts a voice query for camcorders, as in "find me a camcorder," the user can be presented with the retrieved results played out automatically. Presentation time may be increased and/or scroll speed may be reduced for relatively more relevant results. Similarly, search results for movies, music, recipes, consumables, fashion, local events, restaurants, stock prices, etc. may be presented with auto-scroll or auto-navigate functionality.

Certain embodiments may operate in real-time for any amount of streaming data, and can be responsive to user inputs (e.g., manually stopping the auto-scroll and reading nearby posts), while new data is continuously streaming in. Content such as messages, stories, posts, tweets, news articles, event updates, or other content may be scrolled through in an intelligent manner with variable scroll speed. Scroll speed may be reduced when the content is of relevance to the user and increased for content with little relevance or low information content.

Swipe or gesture sensitivity may be dynamic in some embodiments. In some instances, swipe or gesture sensitivity may be automatically adjusted based at least in part on an incoming rate of content, or a rate at which new content is being added to a content feed. Swipe or gesture sensitivity may depend, at least in part, on a relevance of the newly added content or items to the user, a number of relevant items that are yet to be consumed, and/or a speed of content consumption by the user. User feedback and user attributes may be used to determine auto-scroll speed and/or scroll sensitivity.

In one example embodiment, a content feed or other list or set of items or content may start moving automatically as soon as the content feed is opened, thereby eliminating the need to swipe or use any human interaction to peruse the feed or list of items.

By determining relevance and/or importance of content in a content feed and by controlling presentation settings of a device with respect to certain content, users may be able to consume content that is relevant, interesting, important, and/or informational based at least in part on a user's current and/or historical interests or line of thought, and may not have to manually interact with a device to manage navigation of the content feed.

The systems, methods, computer-readable media, techniques, and methodologies for user-specific auto-scrolling devices and methods may result in improved control of user devices and effectiveness of content presentation at user devices, as well as improved and efficient use of computer resources and communications with data storage and management devices. Embodiments may relate to voice or audio-based content or content feeds.

Example embodiments of the disclosure provide a number of technical features or technical effects. For example, in accordance with example embodiments of the disclosure, certain embodiments of the disclosure may control scrolling or navigating of content on devices. Control of content presented at devices, as well as presentation times, sequencing, and/or positioning may be caused by embodiments of the disclosure. Certain embodiments may automatically modify a pace or speed of streaming data such as stories, posts, messages, activity and event updates, news articles, flips/pages, and the like as the content is presented at a user device. As a result, information overload may be reduced for users and comprehension may be improved, while content may be presented in a smooth and efficient manner. Certain embodiments may eliminate manual interaction with user devices to navigate through or scroll through content or content feeds. Content may be determined to be relevant or irrelevant, important or unimportant, and/or to have a certain level of information content. Embodiments may be used with ordered or unordered sets of content and may or may not include rankings of content. Certain embodiments may not rank, order, or rearrange content in a content feed when new items are added to the content feed. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
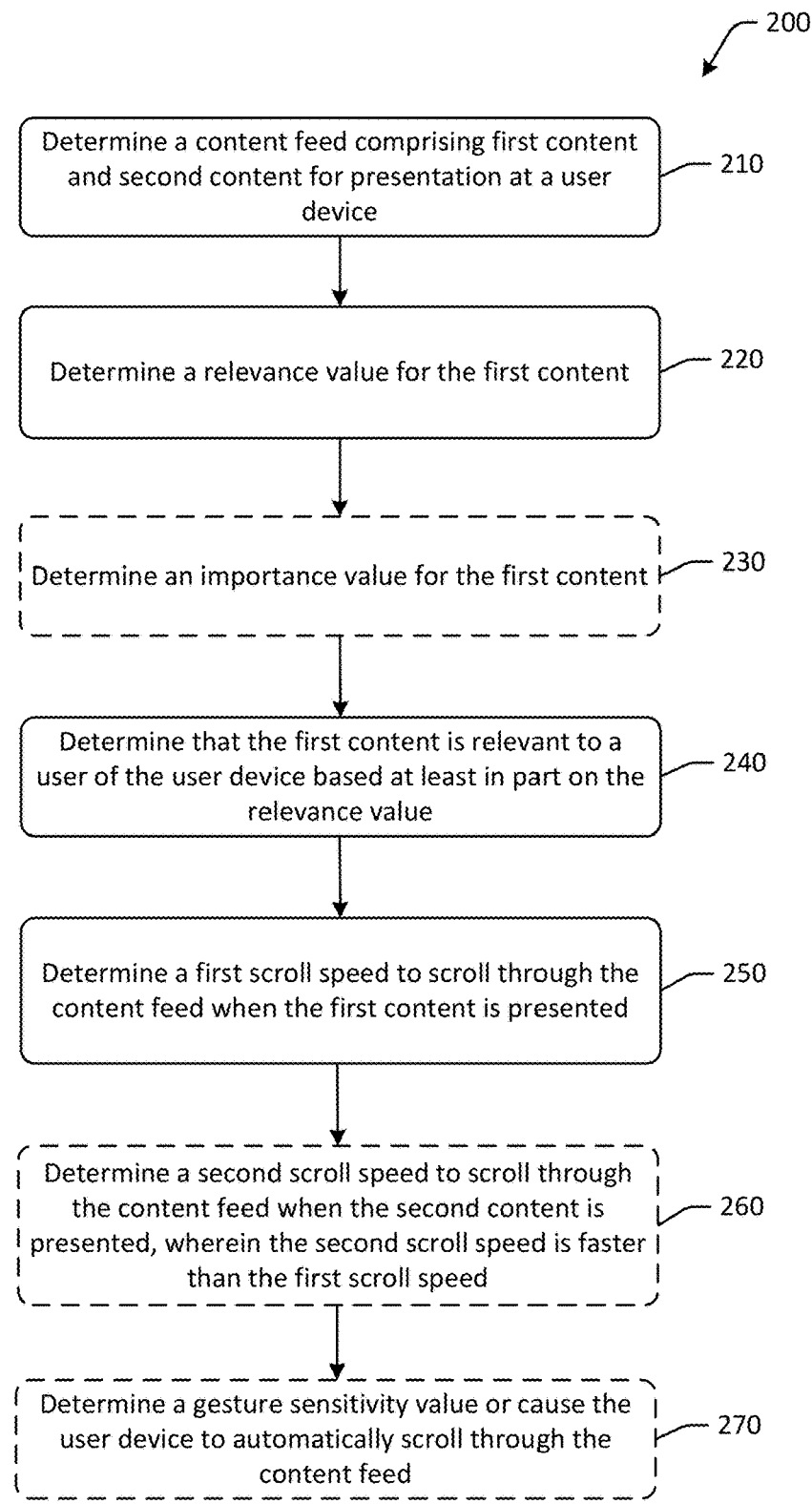
FIG. 2 is an example process flow diagram for an auto-scrolling method in accordance with one or more embodiments of the disclosure.

Referring to FIG. 2, an example process flow 200 for user-specific auto-scrolling in accordance with one or more embodiments of the disclosure is depicted. Although certain operations are illustrated as occurring separately in FIG. 2, some or all of the operations may occur concurrently or partially concurrently across one or more computer systems, and may occur in any order, or in the illustrated order. Other embodiments may include additional or fewer operations.

At block 210 of the process flow 200, a content feed comprising first content and second content for presentation at a user device may be determined. For example, computer-executable instructions of one or more content feed analysis module(s) stored at a remote server may be executed to determine a content feed. The content feed may include one or more pieces of content, such as posts, stories, snaps, news, search results, product listings, and other content. The content feed may be updated with new content periodically, upon submission of new content, after a certain amount of content is posted, continuously, in real-time, or at another time interval.

At block 220 of the process flow 200, a relevance value for the first content may be determined. For example, computer-executable instructions of one or more relevance determination module(s) stored at a remote server may be executed to determine a relevance score or a relevance value for the first content in the content feed. Relevance scores or relevance values may be determined for a specific user. For example, relevance may be determined based at least in part on historical user interactions (e.g., content that the user has previously consumed, user interests or preferences previously determined, etc.), user attributes, user demographics, and other factors. Relevance scores may be calculated based at least in part on a source of the content, whether or not the content source is associated with the user, an amount of other user activity associated with the content (e.g., how many other users have interacted with the content, a number of views, etc.), and other factors.

Relevance values and/or relevance scores may be used to determine whether content is relevant to a particular user. For example, a relevance score may need to meet or exceed a threshold value to be considered relevant to a user. In one example, a relevance score of 6 or greater on a scale of 0 to 10 may be determined to be relevant to a user, while any score below 6 may be determined to be irrelevant or not relevant to a user. Any other alphanumeric scale or set of values may be used to assign and/or determine relevance of content.

Relevance may be determined for content based at least in part on user attributes associated with a user profile for a particular user. Historical user interaction data associated with the user profile may be used to determine user interests and/or user preferences. Determining relevance values for content may include determining relevance values based at least in part on the user attributes and the user interaction data.

In certain embodiments, a user's current line of thought or current interests may be determined in order to determine whether content is relevant. For example, a topic of user interest in a content feed that a user is currently perusing may be determined. The topic of interest may be a theme associated with a content feed, or may be based at least in part on a search query or other user input or interaction during a browsing session or during a certain time interval. For example, if the user is browsing an NBA basketball themed content feed, or has posted their own content regarding a particular NBA basketball game, a topic of interest may be determined to be NBA and/or a particular NBA game. Topics may be determined based at least in part on titles (e.g. feed titles, album titles, content titles, etc.) and/or other structured attributes of content. Structured attributes may include names of people appearing in content, locations associated with content, people, captions, and other attributes of content.

A set of one or more keywords associated with the topic may be determined. For example, if the topic of interest is NBA, then a set of keywords that may include player names (e.g., Lebron James, Russell Westbrook, Jimmy Butler, players that the user has posted about themselves or liked, etc.), sports or basketball related terms (e.g., injury, buzzer, game winner, overtime, win, lose, etc.), and other keywords may be determined. The set of one or more keywords may include words or terms that may be important and/or relevant to discussions about the topic of interest, which in this example may be the NBA.

In one embodiment, to determine relevance of content to a current topic of interest, a frequency of occurrence of respective keywords of the set of one or more keywords may be determined for particular content. For example, if a content post includes an image with a caption "Lebron James nails buzzer beater, Cavs win," then a frequency of occurrence of NBA related keywords may be determined for the content post. Keywords may include "Lebron James," "buzzer beater," and "win." The content post may be determined to include three keywords. The frequency of occurrence of keywords in the content may be used to determine relevance. For example, content with a minimum threshold of keywords (e.g., three or more keywords, etc.) may be determined to be relevant. The number of keywords appearing in content may also be used to determine information content density. For example, if three of the five terms or words in a content post are keywords, the information content density of the content post may be 3/5, which may be determined to be relatively high.

At optional block 230 of the process flow 200, an importance value for the first content may be determined. For example, computer-executable instructions of one or more content feed analysis module(s) stored at a remote server may be executed to determine an importance score or an importance value for content. Importance scores may be indicative of an importance of particular content, and may be determined based at least in part on a number of user interactions with the content, such as a number of views, a number of likes, a number of comments, or other quantifiable user interactions with the content. Importance scores may be used to determine whether or not to present certain content, and if so, a presentation time or length of time for which to present content.

In some embodiments, importance values or scores may be determined based at least in part on an information content or information content density for particular content. Information content may be determined using the same or different keywords associated with a particular topic. For example, for an NBA game, keywords to determine importance may include "injury," "overtime," "championship," etc. A frequency of occurrence or a number of times an importance keyword appears in content may be used to determine an importance value for the content. Information content density may be a ratio of important keywords to total words in a post and may be indicative of a value of the content (e.g., the higher the information content density, the more important the content, etc.). Importance values may be determined based at least in part on trending topics. For example, a trending topic in a particular content feed may be determined. Keywords associated with the trending topic may be determined, and a frequency of occurrence of the respective keywords may be determined in the content feed. The frequency of occurrence may be used to determine importance values. Keywords may be ranked in order of importance and weighted accordingly.

At block 240 of the process flow 200, it may be determined that the first content is relevant to a user of the user device based at least in part on the relevance value. For example, computer-executable instructions of one or more relevance determination module(s) stored at a remote server may be executed to determine that the relevance value for certain content satisfies a relevance threshold. In some embodiments, an importance value and/or an information content density may be used to determine relevance, while in other embodiments, user attributes and/or user preferences may be used to determine relevance. In certain embodiments, relevance to a user's current line of thinking or current interests, as determined during a particular time interval, such as during the same day, or during a browsing session, may be used to determine relevance.

At block 250 of the process flow 200, a first scroll speed to scroll through the content feed when the first content is presented may be determined. For example, computer-executable instructions of one or more auto-scroll parameter module(s) stored at a remote server may be executed to determine a first scroll speed. The first scroll speed in some instances may be zero, such that the content feed pauses while the content is presented, so as to facilitate consumption of the content by a user. In other instances, the content feed may continue to scroll at a reduced speed, so as to facilitate consumption of the content by a user while the content feed continues to scroll.

The length of time the content is to be presented may be used to determine a scroll speed. For example, if the content is to be presented for 5 seconds, the content feed may pause for 5 seconds and then continue, or may scroll at a speed such that the content is presented for 5 seconds in total as the content feed continues to scroll. In such instances, the scroll speed may be based at least in part on a size of a display and/or a presentation area for the content feed on a display.

Presentation time for certain content may be based at least in part on a total number of relevant content items in the content feed. For example, if there are 23 relevant content posts in a content feed, the length of presentation time for each respective post may be a certain value, whereas if there are 100 relevant content posts in the content feed, the presentation time for respective posts may be less than if there are 23 posts. In some embodiments, the average presentation time for content may be based at least in part on the total number of relevant content items. Individual presentation times may be determined, in some embodiments, based at least in part on a length or a number of words in the content post. For example, the more words in a content post, the longer the presentation time for that post. The average presentation time for content presented may be based at least in part on the total number of relevant content items in the content feed.

In some embodiments, respective presentation times for content may be determined based at least in part on the respective relevance value for the content. For example, the higher the relevance value, the greater the presentation time, so as to bring the content to the user's attention. Other values, such as respective importance values and/or information content densities may be used to determine presentation times for specific content. Relevance and/or importance scores or information content densities may be used to determine whether to pause for content in the content feed. Scrolling through the content feed may be paused (e.g., scroll speed of zero) for a predetermined length of time for certain content. The predetermined length may be the presentation time or another value.

Presentation time for certain content may be determined based at least in part on the content type of the respective content. For example, content may be audio content or video content, such as a gif video. Such content may have a length. For example, a video clip may have a length of 10 seconds. In some embodiments, the minimum presentation time for the content may be the entire length of the content, while in other embodiments, the minimum presentation time may be less than the entire length of content. For example, a portion of the content may be relevant to a user (e.g., only a portion of certain content may include the user's favorite basketball player), and therefore only the relevant portion of the content may be presented, instead of the entire audio or video clip. Further, a minimum portion of the content may be presented for context, so as to allow the user to understand what is going on.

At optional block 260 of the process flow 200, a second scroll speed to scroll through the content feed when the second content is presented may be determined, wherein the second scroll speed is faster than the first scroll speed. For example, computer-executable instructions of one or more auto-scroll parameter module(s) stored at a remote server may be executed to determine a dynamic scroll speed for content. In certain embodiments, scroll speeds may be dynamically adjusted, so as to adjust presentation times for certain content. For example, if first content is highly relevant, as indicated by a relevance value, and/or highly importance as indicated by an importance value, the scroll speed for the first content may be lower than a scroll speed when second content that is less relevant and/or important is presented. As a result, a user may have more time to consume more relevant and/or important content in the content feed.

Presentation time and/or scroll speeds for content and/or the content feed may be based at least in part on an average browsing session length and/or a rate of incoming content. An average browsing session length may be an average amount of time a user spends browsing a content feed, and may be determined based at least in part on historical browsing sessions. Browsing session lengths may be specific to certain times of day (e.g., morning, afternoon, evening, etc.). The average browsing session length may be used to estimate an amount of time that the user will browse the content feed, and can be used to determine presentation times. For example, if the estimated browsing session length is 10 minutes, and there are 100 relevant posts, 10 relevant posts may be presented per minute on average, and presentation times for respective posts may be determined accordingly. Historical user interaction data for a particular user may be used to determine an estimated browsing session length indicative of a predicted length of time the user will browse a content feed.

A rate of incoming content may be used to determine presentation time and/or scroll speeds. The rate of incoming content may be a rate at which new content is added to the content feed over a particular time interval. For example, content may be added to the content feed at a rate of 25 posts per second. The incoming content rate may be used to estimate a rate of incoming relevant content, and may also be used to adjust scroll speed or presentation time. For example, the higher the incoming content rate or the estimated incoming relevant content rate, the less the presentation time and/or the greater the scroll speed. Accordingly, more of the incoming content may be presented than if the scroll speed was static and not determined based at least in part on the incoming rate of content.

At optional block 270 of the process flow 200, a swipe or gesture sensitivity value may be determined, or the user device may be caused to automatically scroll through the content feed. For example, computer-executable instructions of one or more auto-scroll parameter module(s) stored at a remote server may be executed to determine and/or adjust a swipe or gesture sensitivity value. Swipe or gesture sensitivity values may be used to determine a number of posts to scroll past after detecting a gesture or another navigation input at a user device. For example, the greater the swipe or gesture sensitivity value setting at a device, the more content will be scrolled past after detecting a gesture at the device. The less the swipe or gesture sensitivity value, the less content will be scrolled past. Adjusting the swipe or gesture sensitivity value may facilitate consumption of content in a content feed by allowing a user to move relatively more quickly or slowly through the content feed. For example, if the incoming rate of content is increasing, the swipe or gesture sensitivity value may increase, so as to allow the user to move more quickly through the content feed, whereas if the incoming rate of content is reduced, or a number of relevant posts is reduced, the swipe or gesture sensitivity value may be reduced so as to allow the user to spend more time on relevant content. Swipe or gesture sensitivity values or settings may be determined based at least in part on a rate of incoming content and a number of unpresented relevant content.

In some embodiments, the user may not need to swipe, and the user device may be caused to automatically scroll through the content feed. The scroll speed may be dynamically adjusted, and presentation times for certain content may be used to adjust various auto-scroll parameters. The user may consume content from the auto-scrolled content feed, and may interact with the device and/or the content feed as desired to like, pause, comment, or otherwise engage with the content feed or auto-scroll parameters.

While presented in the context of first content and second content in FIG. 2, in some embodiments, the first content and/or the second content may be reversed, for example, based at least in part on user interaction. In another example, if there is insufficient relevant content associated with a first topic, content associated with another topic may be presented until additional content associated with the first topic is available.

Figure 3:
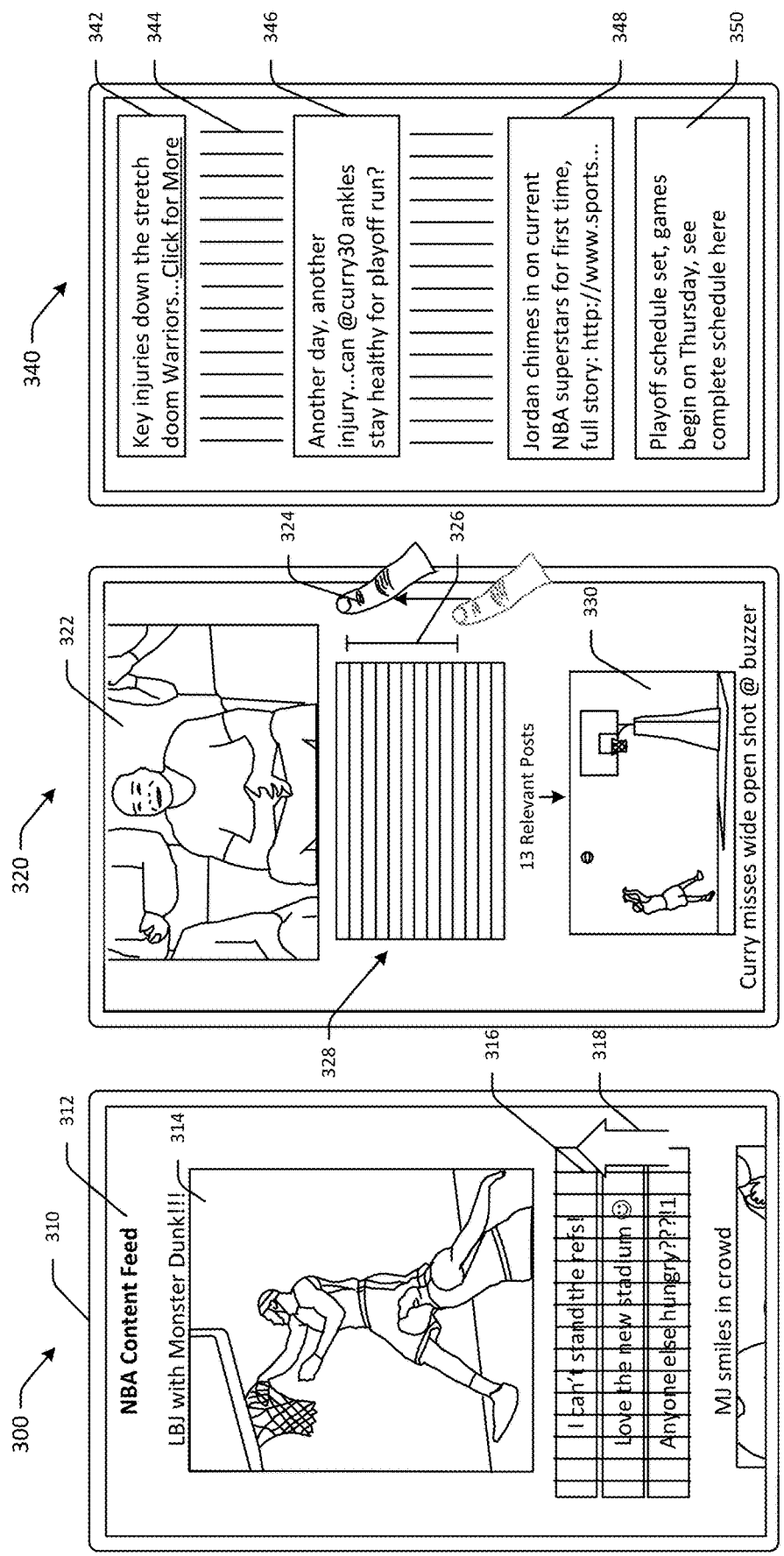
FIG. 3 depicts example user interfaces of a content feed at a device for user-specific auto-scrolling in accordance with one or more embodiments of the disclosure.

FIG. 3 depicts example user interfaces of a content feed at a device for user-specific auto-scrolling in accordance with one or more embodiments of the disclosure. A user may be consuming content at a user device 310. The content may be presented at a first user interface 300 in a content feed. The content feed may be an NBA content feed 312 or for another theme or topic. The content feed may not have a specific theme in some embodiments, and instead may include content from different disparate sources. In the example of FIG. 3, the NBA content feed 312 may include content related to an ongoing basketball game between the Cavaliers and the Warriors.

Embodiments of the disclosure may determine content relevance to determine which content in the entire content feed 312 should be presented and/or how long the content should be presented for. Relevance may be determined based at least in part on the relevance to the NBA content feed 312, and may be determined based at least in part on one or more keywords associated with the topic and/or category. For example, a first content post 314 may include an image with a caption of "LBJ with Monster Dunk!!!" "LBJ" may be a keyword, along with "dunk," and as a result, the first content post 314 may be presented. The user may indicate that the user likes the first content post 314, and as a result, the user's current interests may be determined to include not only NBA basketball, but Lebron James as well.

Certain content posts 316 may be determined not to be relevant to either or both the theme of the content feed 312 and/or the user's interests. The content posts 316 may therefore not be presented, or may be presented for a short length of time, or may be presented in a condensed or collapsed format (e.g., partially presented, etc.). For example, irrelevant content posts 316 may include a post from a user regarding referees, another post regarding a stadium, another post regarding a user being hungry, etc. The irrelevant content posts 316 may not be related to the theme of the content feed 312 or to the user's interests and may not include a minimum threshold of relevant keywords. The irrelevant content posts 316 may be auto-scrolled 318 past, so subsequent relevant content may be presented.

At a second user interface 320, a second content post 322 may be presented and may include an image captioned "MJ smiles in crowd." While the image and/or post may or may not include keywords associated with the content feed 312, the second content post 322 may be determined to be important based at least in part on other user's interaction with the second content post 322, or the user's previous indication that the user like "MJ" or "Michael Jordan." For example, the second content post 322 may have over 1,000 likes or smiles and may therefore be determined to be important. As a result, the second content post 322 may be presented.

The user of the user device 310 may desire to fast forward or skip through the content feed 312. For example, the user may swipe 324 upwards on the device 310 to navigate further through the content feed 312. A swipe distance 326 may be determined and may be used in conjunction with a swipe sensitivity setting for the device and/or the content feed to determine how many posts to scroll past in the content feed 312. For example, the greater the swipe distance and/or the higher the swipe sensitivity, the greater the number of irrelevant posts that will be skipped or scrolled past. In the example of FIG. 3, a number of irrelevant posts 328 may be scrolled past after detecting, or in response to detecting, the swipe gesture 324. Other embodiments may include different gestures, such as motions, different tactile gestures, audible gestures (e.g., sounds, etc.), and the like.

The content feed 312 may be scrolled to subsequent relevant content, which may be a third content post 330 that includes an image captioned "Curry misses wide open shot @ buzzer." The third content post 330 may be determined to be important and/or relevant. For example, the third content post 330 may be relevant due to the caption including one or more keywords associated with the NBA theme of the content feed. The third content post 330 may therefore be presented. If the third content post 330 were positioned earlier in the content feed 312 (e.g., just after the user swiped or performed another gesture), the third content post 330 may still be presented for a certain presentation length, and then after the presentation length has passed, the content feed may continue to scroll through subsequent irrelevant content posts based at least in part on the swipe or gesture sensitivity and/or swipe distance. An indication of a number of relevant content posts may also be presented at the display of the user device 310. For example, if there are 13 unpresented relevant content posts, an indication may be provided, as illustrated at the second user interface 320, so as to alert the user of upcoming content.

At a third user interface 340, a fourth content post 342 may be presented and may relate to key injuries down the stretch doom Warriors. The fourth content post 342 may be determined to be relevant and/or important, as well as informational. For example, the fourth content post 342 may have a relatively high information content density, as determined by the injury report and game result information. Subsequent irrelevant or unimportant posts 344 may be scrolled past, as indicated by the vertical lines in the third user interface 340. The content feed 312 may be scrolled to a fifth content post 346 that states "another day, another injury . . . can @curry30 ankles stay healthy for playoff run?" The fifth content post 346 may be determined to be relevant due to the frequency of occurrence of keywords, and/or may be determined to be important due to the information source or keywords, and may therefore be presented. Presentation times for the respective posts may be determined based at least in part on the number of words in the respective posts.

A sixth content post 348 may be determined to be important due to a number of likes or comments it has received, and may therefore be presented, followed by a seventh content post 350 related to playoff scheduling that is determined to be important based at least in part on its content.

Thresholds for relevant and/or importance may be dynamic and may be based at least in part on incoming rate of new content added to the content feed 312, as well as a number of relevant content items to be presented, and in some instances, an estimated browsing session length. For example, the greater the rate of incoming content, the higher the relevance threshold may be set, so as to reduce a total number of relevant content items to be presented, or to reduce a presentation time of relevant content. Incoming rate of content may be determined by determining a number of content added to the content feed within a predetermined time interval. A total number of unpresented relevant content in the content feed may be determined. Based at least in part on the incoming rate of content and/or the total number of unpresented relevant content, a swipe or gesture sensitivity value may be set, relevance value thresholds may be adjusted, importance value thresholds may be adjusted, presentation times may be adjusted, and other auto-scroll parameters may be adjusted.

Figure 4:
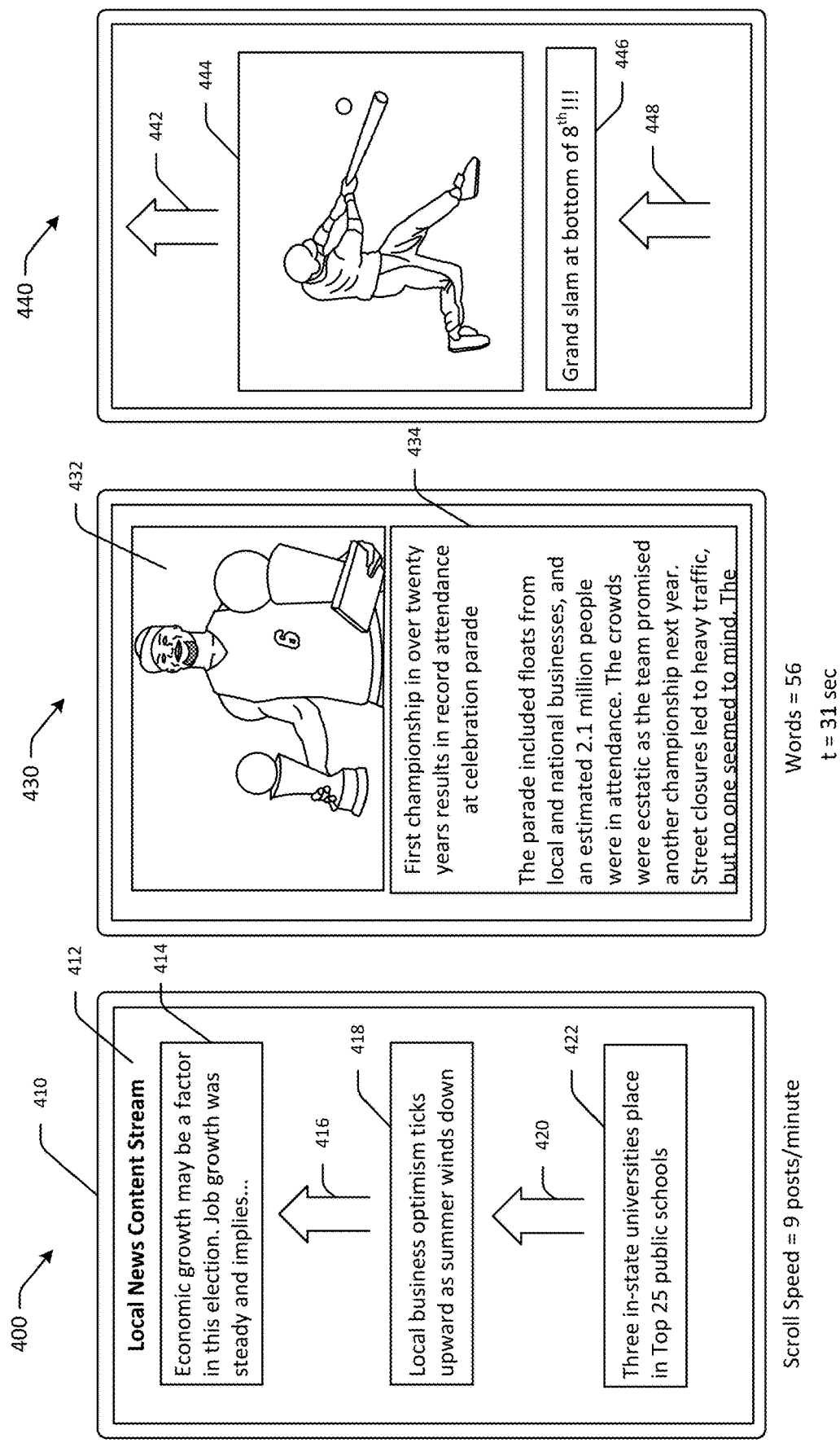
FIG. 4 depicts example user interfaces at a device for user-specific auto-scrolling in accordance with one or more embodiments of the disclosure.

FIG. 4 depicts example user interfaces at a device for user-specific auto-scrolling in accordance with one or more embodiments of the disclosure. In FIG. 4, a user device 410 may implement auto-scrolling. The user device 410 may present a local news content stream 412, which may be a content feed to which content can be posted by other users. A first content post 414 may be presented at the user device 410 related to "economic growth may be a factor in this election. Job growth was steady and implies . . . " The first content post 414 may be presented because it is determined to be relevant to the user's current or historical interests, or may otherwise be determined to be important and/or have relatively high information content in view of the local news content stream.

The user device 410 may automatically scroll, or may be caused to automatically scroll, past subsequent content or posts 416 that are not relevant and/or not important. A second content post 418 may be determined to be relevant and may be presented. The second content post 418 may be presented as the content feed 412 continues to scroll or the content feed 412 may be paused when, for example, the second content post 418 reaches a middle section of a display of the device 410. The second content post 418 may relate to local business optimism. Subsequent posts may be skipped or scrolled past 420 that are not relevant or important. A third content post 422 may be determined to be relevant and may therefore be presented. The third content post 422 may relate to local school rankings.

A scroll speed for automatically scrolling through the content feed 412 may be set to 9 posts/minute. The user may therefore have a minute to consume 9 posts and to click on or otherwise interact with any of the posts (e.g., click or tap a link, etc.). The scroll speed may be based at least in part on a total number of relevant posts, an incoming rate of content posts, an estimated browsing session length, and/or other factors.

The content feed 412 may continue to be automatically scrolled. At a second user interface 430, the user may select a fourth content post 432 related to a basketball championship, and the user device may direct a browser to an associated link. The content at the link may be presented and may include text. A presentation time for the text may be determined based at least in part on the user's reading speed and/or a number of words in the presented text. For example, the fourth content post 432 may include a text portion 434 with 56 words. The user may have a reading speed or an estimated reading speed of 108 words per minute. As a result, a presentation time for the text portion 434 may be determined to be 31 seconds, after which subsequent text may be presented or the content feed 412 may be returned to and automatic scrolling may continue. Reading speed may be determined based on historical data (e.g., observation of user interaction based on words presented, etc.) and/or user inputs. Reading speed for a particular user may be determined based at least in part on the user attributes and the user interaction data. Reading speed may be used to determine scroll speeds and/or presentation times or a length of time to present the first content. Presentation times may be based at least in part on the information content density of a particular post.

For example, the user device 410 may return to the content feed 412 at a third user interface 440 and may scroll past content 442 until reaching relevant content at a fifth content post 444. The fifth content post 444 may relate to baseball and may be determined to be relevant due to the user's interaction with the sports related fourth content post 432. The fifth content post 444 may include a text portion 446 that may be presented for a presentation time and then the content feed 412 may continue to be scrolled through 448 until another relevant post is presented.

Accordingly, embodiments of the disclosure may take a list of items, such as messages, posts, stories, tweets, articles, updates, product identifiers, activities, events, etc. as inputs. Respective inputs may be assigned scores based at least in part on relevance and/or importance. Scores may be used to determine which items in the list will be given preferential display time during scrolling. Scores may be assigned not only based on independent importance, but based at least in part on scores for previous and/or successive sets of items that have been assigned high scores. For example, in FIG. 4, the fifth content post 444 related to baseball may not initially have been assigned a high score, but due to the user's interest in the basketball or sports related fourth content post 432, the fifth content post 444 may be assigned a relatively higher score. As a result, highlighted or presented items may collectively form a cohesive and comprehensive set that conveys the gist of the overall content presented in a content feed. For instance, in the example of an NBA basketball game, a presented set of tweets selected for the auto-scroll to slow down and delineate, may include tweets that are relevant and important for the viewer, and may collectively form a synopsis of the game in real-time. For other content feeds, stories that are presented during auto-scroll may collectively form a coherent and meaningful set, and may provide the user with the ability to stop the auto-scroll at any time and see the neighboring stories. For real-time, reactive, and streaming content feeds, certain embodiments may augment the relevance, popularity, and timeliness of stories in a feed while ensuring feed stability and speed of delivery, which in turn may improve user engagement.

In some embodiments, a content feed may include an ordered (e.g., chronologically, etc.) set of content streaming into a personalized feed of a user. Embodiments may determine which content to present by implementing a real-time pruning scheme that can be based at least in part on Hoeffding bound theory. A set of training examples may be used to determine discrete class labels and/or attributes of the content in an interest circle. Embodiments may use the training examples to predict the classes of future content with high accuracy by implementing decision tree learning. Each node of a decision tree includes a test on an attribute, and each branch from a node corresponds to a possible outcome of the test, and each leaf contains a class prediction of whether to auto-scroll to or skip. Certain embodiments may identify the best attribute of a story/post (or story-line) in certain content, based at least in part on training examples. The training examples can be derived from the user scrolling and pausing at specific posts initially or by other user interactions or observations of user behavior. Additional training examples can be added on-the-fly as the user manually pauses and reads other posts during the auto-scroll process. Embodiments may determine exactly how many examples are necessary at each node of the decision tree by using a statistical method, such as a Hoeffding bound. The Hoeffding bound may be independent of the probability distribution generating the observations. Embodiments may therefore operate in real-time with large amounts of streaming data.

Figure 5:
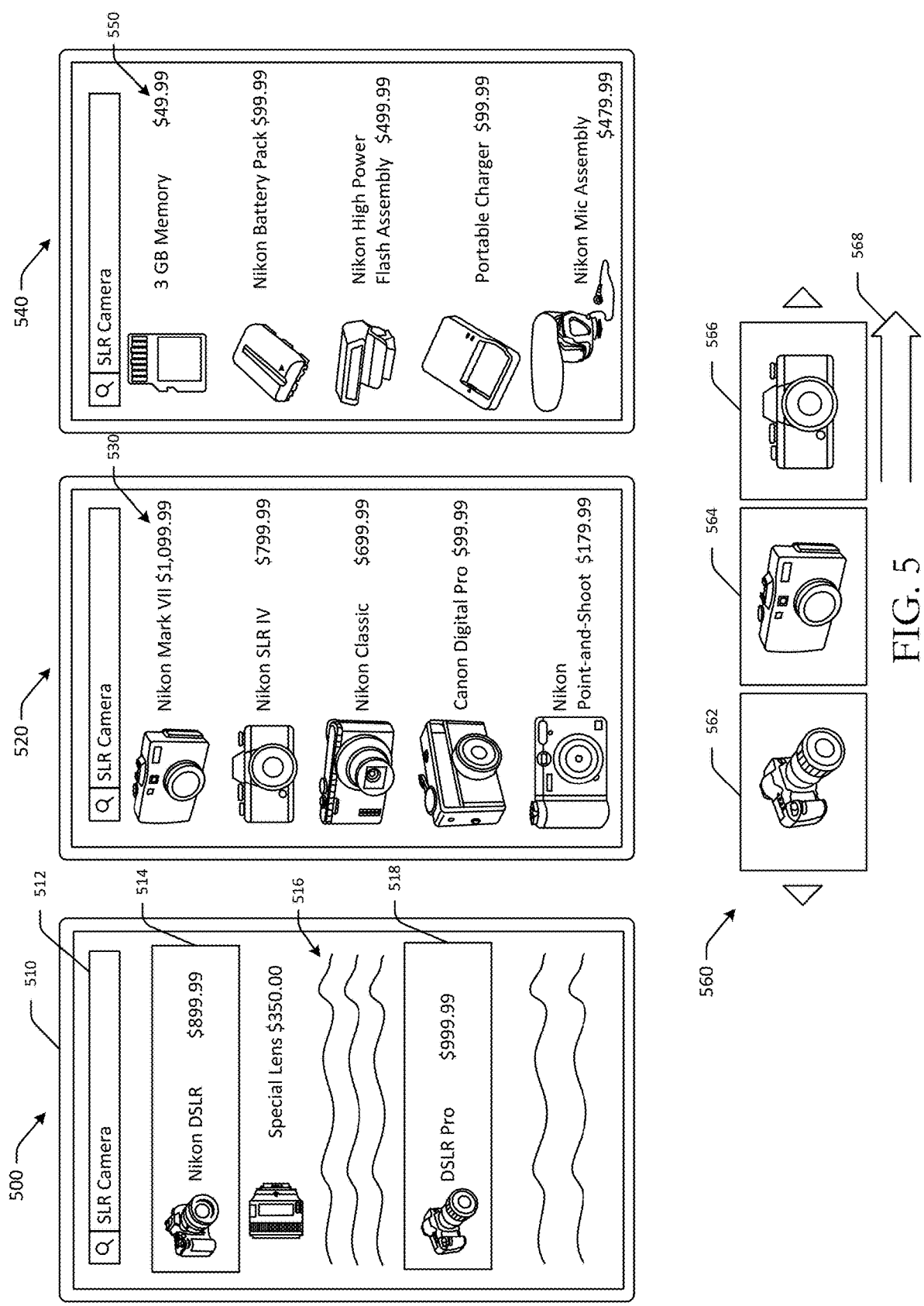
FIG. 5 depicts example user interfaces of product search results in a scrollable format at a device for user-specific auto-scrolling in accordance with one or more embodiments of the disclosure.

FIG. 5 depicts example user interfaces of product search results in a scrollable format at a device for user-specific auto-scrolling in accordance with one or more embodiments of the disclosure. A user may use a user device 510 to search for products or other information. Embodiments of the disclosure may present search results that are auto-scrolled through and emphasize or collectively form a specific set of products, such as a high-end Nikon camera pack for the user.

At a first user interface 500, the user may search for an "SLR camera" at a user input 512. Search results may include many different kinds of cameras, manufacturers, products, accessories, and the like. Embodiments of the disclosure may determine relevance of respective search results and determine a scroll speed and/or a presentation length for respective search results based at least in part on the relevance. In the example of FIG. 5, a set of search results for a product may include over a thousand different items. Navigating through the search results may take considerable time and effort. Further, swiping through the search results on a mobile device may scroll through the search results at a device-specific speed and scroll through several items rapidly without allowing sufficient time to view relevant items. Embodiments of the disclosure may determine that a Nikon DSLR camera 514 is relevant to the user's search, and as a result, the product listing 514 may be presented. For example, while auto-scrolling through the search results, the auto-scrolling may be slowed or paused at the product listing 514. The auto-scrolling may resume past product listings 516 that may not be relevant to the user (e.g., the user may have only purchased Nikon cameras in the past, etc.), until another product listing 518 that is relevant is determined and presented. For example, the user may own Nikon lenses and may therefore be most likely currently interested in Nikon cameras and accessories. All search results may not be assigned the same importance scores while being presented to the user. In some embodiments, search results may be ordered based at least in part on the respective relevance scores, as search results may not have new incoming content, unlike live content streams.

At a second user interface 520, product search results may continue to be presented, with highly relevant products, such as product listing 530 for a Nikon camera, paused for before auto-scrolling resumes. At a third user interface 540, product search results may include accessories 550, which may also be assigned relevance scores and presented accordingly. Users may therefore automatically scroll through search results based at least in part on relevance of product listings and may consume more search results than manually scrolling or navigating through the search results.

Certain embodiments may include a carousel format 560 presentation of search results that may be cycled through in accordance with the user-specific auto-scrolling of this disclosure. For example, a first camera 562 may be a Nikon and may be presented for a first length of time, while a second camera 564 may be Canon and presented for a shorter length of time, and a third camera 566 may not be a DSLR camera and may be presented for a different length of time or not presented at all. The carousel 560 may be auto-scrolled 568 through in any direction. The carousel 560 may be presented on any appropriate device, such as a mobile device, a laptop, a tablet, a smartphone, a television, or another suitable device, and may be presented as part of an application, a webpage, or another digital platform.

One or more operations of the method, process flows, or use cases of FIGS. 1-5 may have been described above as being performed by a user device, or more specifically, by one or more program module(s), applications, or the like executing on a device. It should be appreciated, however, that any of the operations of methods, process flows, or use cases of FIGS. 1-5 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 6:
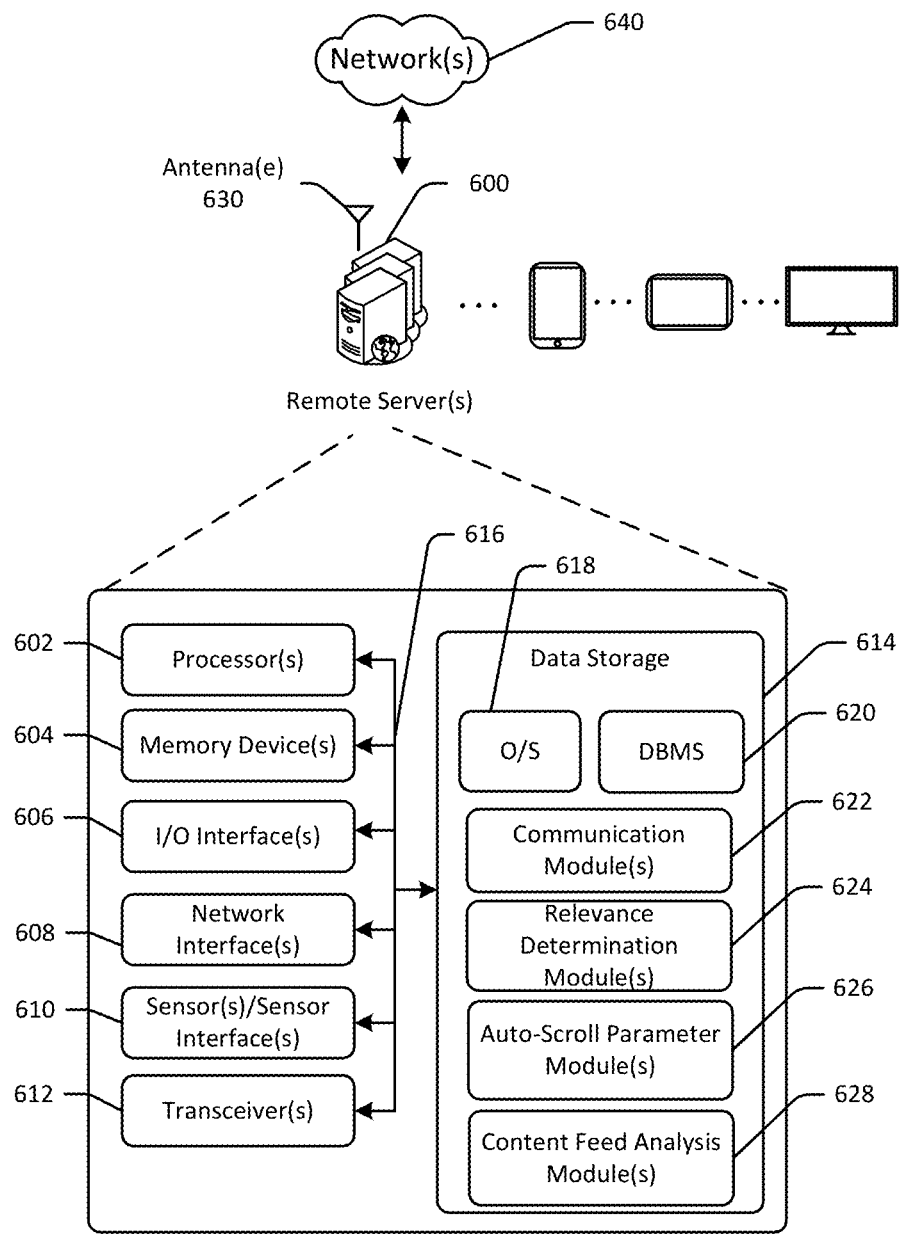
FIG. 6 schematically illustrates an example architecture of a system in accordance with one or more embodiments of the disclosure.

FIG. 6 is a schematic block diagram of one or more illustrative remote server(s) 600 in accordance with one or more example embodiments of the disclosure. The remote server(s) 600 may include any suitable computing device including, but not limited to, a server system, a mobile device such as a smartphone, a tablet, an e-reader, a wearable device, or the like; a desktop computer; a laptop computer; a content streaming device; a set-top box; or the like. The remote server(s) 600 may correspond to an illustrative device configuration for the compliance verification servers of FIGS. 1-5.

The remote server(s) 600 may be configured to communicate via one or more networks with one or more servers, user devices, or the like. The remote server(s) 600 may be configured to perform the auto-scrolling features described herein, or control performance of the auto-scrolling features described herein by another device. The remote server(s) 600 may be configured to determine content relevance, determine content importance, determine content information density, control auto-scroll settings or parameters, determine presentation times, scroll speeds, swipe or gesture sensitivity values, and the like. In some embodiments, a single remote server or single group of remote servers may be configured to perform more than one type of auto-scroll or related functionality.

The remote server(s) 600 may be configured to communicate via one or more networks 640. Such network(s) 640 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 640 may have any suitable communication range associated therewith and may include, for example, global networks (e.g., the Internet), metropolitan area networks (MANs), wide area networks (WANs), local area networks (LANs), or personal area networks (PANs). In addition, such network(s) 640 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server(s) 600 may include one or more processors (processor(s)) 602, one or more memory devices 604 (generically referred to in this section as memory 604), one or more input/output ("I/O") interface(s) 606, one or more network interface(s) 608, one or more sensors or sensor interface(s) 610, one or more transceivers 612, and data storage 614. The remote server(s) 600 may further include one or more buses 616 that functionally couple various components of the remote server(s) 600. The remote server(s) 600 may further include one or more antenna(e) 630 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 616 may include at least one of a system bus, a memory bus, an address bus, or a message bus, and may permit the exchange of information (e.g., data (including computer-executable code), signaling, etc.) between various components of the remote server(s) 600. The bus(es) 616 may include, without limitation, a memory bus or a memory controller, a peripheral bus, an accelerated graphics port, and so forth. The bus(es) 616 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the remote server(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 614 may include removable storage and/or non-removable storage including, but not limited to, magnetic storage, optical disk storage, and/or tape storage. The data storage 614 may provide non-volatile storage of computer-executable instructions and other data. The memory 604 and the data storage 614, removable and/or non-removable, are examples of computer-readable storage media (CRSM) as that term is used herein.

The data storage 614 may store computer-executable code, instructions, or the like that may be loadable into the memory 604 and executable by the processor(s) 602 to cause the processor(s) 602 to perform or initiate various operations. The data storage 614 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to data storage 614 for non-volatile storage.

More specifically, the data storage 614 may store one or more operating systems (O/S) 618; one or more database management systems (DBMS) 620; and one or more program module(s), applications, engines, computer-executable code, scripts, or the like such as, for example, one or more communication module(s) 622, one or more relevance determination module(s) 624, one or more auto-scroll parameter module(s) 626, and/or one or more content feed analysis module(s) 628. Some or all of these module(s) may be or include sub-module(s). Any of the components depicted as being stored in data storage 614 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 614 may support the functionality described in reference to the corresponding components named earlier in this disclosure.

The data storage 614 may further store various types of data utilized by the components of the remote server(s) 600. Any data stored in the data storage 614 may be loaded into the memory 604 for use by the processor(s) 602 in executing computer-executable code. In addition, any data depicted as being stored in the data storage 614 may potentially be stored in one or more datastore(s) and may be accessed via the DBMS 620 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, an example datastore(s) may include, for example, user attribute data, user interaction data, user profile data, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the remote server(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the communication module(s) 622 may include computer-executable instructions, code, or the like that responsive to execution by one or more of the processor(s) 602 may perform functions including, but not limited to, communicating with remote servers or devices, communicating with remote datastores, communicating with local servers or devices on an intranet, sending or receiving information and instructions, and the like.

The relevance determination module(s) 624 may include computer-executable instructions, code, or the like that responsive to execution by one or more of the processor(s) 602 may perform functions including, but not limited to, generating relevance scores, determining whether content is relevant or meets a relevance threshold, determining current user interests, determining importance values, determining content information density values, and the like.

The auto-scroll parameter module(s) 626 may include computer-executable instructions, code, or the like that responsive to execution by one or more of the processor(s)

602 may perform functions including, but not limited to, determining scroll speed values, determining swipe or gesture sensitivity values, setting scroll speed settings, setting swipe or gesture sensitivity settings, determining presentation times, controlling operation of local or remote devices, determining user interactions, determining browsing session data, and the like.

The content feed analysis module(s) 628 may include computer-executable instructions, code, or the like that responsive to execution by one or more of the processor(s) 602 may perform functions including, but not limited to, determining keywords, determining trending topics, determining user interests, determining frequency of occurrence, determining content information density, determining incoming content rates, determining content consumption rates, determining reading or consumption speeds, and the like.

Referring now to other illustrative components depicted as being stored in the data storage 614, the O/S 618 may be loaded from the data storage 614 into the memory 604 and may provide an interface between other application software executing on the remote server(s) 600 and the hardware resources of the remote server(s) 600. More specifically, the O/S 618 may include a set of computer-executable instructions for managing the hardware resources of the remote server(s) 600 and for providing common services to other application programs (e.g., managing memory allocation among various application programs). In certain example embodiments, the O/S 618 may control execution of the other program module(s) to dynamically enhance characters for content rendering. The O/S 618 may include any operating system now known or which may be developed in the future including, but not limited to, any server operating system, any mainframe operating system, or any other proprietary or non-proprietary operating system.

The DBMS 620 may be loaded into the memory 604 and may support functionality for accessing, retrieving, storing, and/or manipulating data stored in the memory 604 and/or data stored in the data storage 614. The DBMS 620 may use any of a variety of database models (e.g., relational model, object model, etc.) and may support any of a variety of query languages. The DBMS 620 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server(s) 600 is a mobile device, the DBMS 620 may be any suitable light-weight DBMS optimized for performance on a mobile device.

Referring now to other illustrative components of the remote server(s) 600, the input/output (I/O) interface(s) 606 may facilitate the receipt of input information by the remote server(s) 600 from one or more I/O devices as well as the output of information from the remote server(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(e) 630 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, a WiMAX network, a 3G network, etc.

The remote server(s) 600 may further include one or more network interface(s) 608 via which the remote server(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna(e) 630 may include any suitable type of antenna depending, for example, on the communications protocols used to transmit or receive signals via the antenna (e) 630. Non-limiting examples of suitable antennae may include directional antennae, non-directional antennae, dipole antennae, folded dipole antennae, patch antennae, multiple-input multiple-output (MIMO) antennae, or the like. The antenna(e) 630 may be communicatively coupled to one or more transceivers 612 or radio components to which or from which signals may be transmitted or received.

As previously described, the antenna(e) 630 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 630 may additionally, or alternatively, include a Wi-Fi antenna configured to transmit or receive signals in accordance with established standards and protocols, such as the IEEE 1002.11 family of standards, including via 2.4 GHz channels (e.g., 1002.11b, 1002.11g, 1002.11n), 5 GHz channels (e.g., 1002.11n, 1002.11ac), or 60 GHz channels (e.g., 1002.11ad). In alternative example embodiments, the antenna(e) 630 may be configured to transmit or receive radio frequency signals within any suitable frequency range forming part of the unlicensed portion of the radio spectrum.

The antenna(e) 630 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 630—transmitting or receiving radio frequency (RF) signals in the bandwidth and/or channels corresponding to the communications protocols utilized by the remote server(s) 600 to communicate with other devices. The transceiver(s) 612 may include hardware, software, and/or firmware for modulating, transmitting, or receiving—potentially in cooperation with any of antenna(e) 630—communications signals according to any of the communications protocols discussed above including, but not limited to, one or more Wi-Fi and/or Wi-Fi direct protocols, as standardized by the IEEE 1002.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the remote server(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 6 as being stored in the data storage 614 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server(s) 600, and/or hosted on other computing device(s) accessible via one or more networks, may be provided to support the functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the remote server(s) 600 may include alternate and/or additional hardware, software, or firmware components beyond those described or depicted without departing from the scope of the disclosure. More particularly, it should be appreciated that software, firmware, or hardware components depicted as forming part of the remote server(s) 600 are merely illustrative and that some components may not be present or additional components may be provided in various embodiments. While various illustrative program module(s) have been depicted and described as software module(s) stored in the data storage 614, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-5 may be performed by a device having the illustrative configuration depicted in FIG. 6, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more computer processors coupled to at least one memory device, a user identifier of a user that is using a user device, wherein the user device comprises a touchscreen display;
   determining user attributes associated with the user identifier;
   determining user interaction data associated with the user identifier, wherein the user interaction data is indicative of previous interactions between the user and content presented at the touchscreen display;

identifying a scrollable content feed for presentation at the touchscreen display, the scrollable content feed comprising first content, second content, and third content;

determining, using the user interaction data and a time of day, an estimated browsing session length indicative of a predicted length of time the user will browse the scrollable content feed;

determining a rate of incoming content at the scrollable content feed;

determining a first relevance value for the first content using the user attributes and the user interaction data;

determining that the first content is relevant content using the first relevance value;

determining a first length of time to present the first content using the first relevance value;

determining a second relevance value for the second content using the user attributes and the user interaction data;

determining that the second content is irrelevant content using the second relevance value;

determining a third relevance value for the third content using the user attributes and the user interaction data;

determining that the third content is relevant content using the third relevance value;

determining a second length of time to present the third content using the third relevance value;

presenting the first content for the first length of time;

determining a total number of unpresented relevant content in the scrollable content feed;

determining a swipe sensitivity value using the rate of incoming content and the total number of unpresented relevant content, wherein the swipe sensitivity value increases based at least in part on a first increase in the rate of incoming content and a second increase in the total number of unpresented relevant content, and wherein the swipe sensitivity value determines an amount of irrelevant content that is scrolled past when a first gesture is detected;

determining the first gesture;

determining a scroll speed value for scrolling from the first content, skipping the second content, to the third content in response to the first gesture based at least in part on the estimated browsing session length and the swipe sensitivity value;

presenting the scrollable content feed in a scrollable manner, such that the second content is skipped; and presenting the third content for the second length of time.

2. The method of claim 1, further comprising:

determining a trending topic in the scrollable content feed;

determining a first keyword associated with the trending topic;

determining a first frequency of occurrence of the first keyword in the scrollable content feed;

determining a second keyword associated with the trending topic;

determining a second frequency of occurrence of the second keyword in the scrollable content feed;

determining that the first frequency of occurrence is greater than the second frequency of occurrence;

determining that the first content comprises the first keyword;

determining a first importance value of the first content using the first keyword;

determining that the third content comprises the second keyword; and determining a second importance value of the third content using the second keyword, wherein the second importance value is less than the first importance value;

wherein determining the first length of time to present the first content using the first relevance value comprises determining the first length of time to present the first content using the first relevance value and the first importance value; and wherein determining the second length of time to present the third content using the third relevance value comprises determining the second length of time to present the third content using the third relevance value and the second importance value, wherein the second length of time is shorter than the first length of time.

3. The method of claim 1, wherein the second content is positioned between the first content and the third content in the scrollable content feed, the method further comprising:

determining, using the user attributes and the user interaction data, an average reading speed of the user;

determining a number of relevant content in the scrollable content feed, wherein the number of relevant content comprises the first content and the third content;

determining a screen size of the touchscreen display; and determining the scroll speed value for scrolling from the first content, skipping the second content, to the third content in response to the first gesture using at least one of the estimated browsing session length, the average reading speed, the number of relevant content, the swipe sensitivity value, and the screen size;

wherein scrolling through the scrollable content feed past the second content comprises scrolling from the first content to the third content at the scroll speed value.

4. The method of claim 1, further comprising:

determining a number of content added to the scrollable content feed within a predetermined time interval; and determining the rate of incoming content using the number of content and the predetermined time interval.

5. A method comprising:

determining, by one or more computer processors coupled to at least one memory, a content feed comprising first content, second content, and third content for presentation at a user device;

determining user interaction data based at least in part on a user profile of a user;

determining an average browsing session length based at least in part on the user interaction data and a time of day;

determining a rate of incoming content to the content feed;

determining a first relevance value for the first content;

determining that the first content is relevant to a user account associated with the user of the user device based at least in part on the first relevance value;

determining a second relevance value for the second content;

determining that the second content is irrelevant based at least in part on the second relevance value;

determining a number of unpresented relevant content in the content feed;

determining a gesture sensitivity value based at least in part on the rate of incoming content and the number of unpresented relevant content, wherein the gesture sensitivity value increases based at least in part on a first increase in the rate of incoming content and a second increase in the number of unpresented relevant content, and wherein the gesture sensitivity value determines an amount of irrelevant content that is scrolled past when a gesture is detected;
determining a first scroll speed to scroll through the content feed when the first content is presented by the user device, wherein the first scroll speed is based at least in part on the average browsing session length and the gesture sensitivity value;
determining the gesture; and
scrolling based on the first scroll speed, from the first content, skipping the second content, to the third content in response to the gesture.

6. The method of claim 5, further comprising:
determining a topic of user interest in the content feed;
determining a set of one or more keywords associated with the topic;
determining a frequency of occurrence of respective keywords of the set of one or more keywords in the first content;
determining an information content density of the first content based at least in part on the frequency of occurrence of the respective keywords; and
determining a length of time to present the first content based at least in part on the information content density.

7. The method of claim 5, further comprising:
determining user attributes associated with the user profile of the user; and
determining a reading speed of the user based at least in part on the user attributes and the user interaction data;
wherein determining the first scroll speed to scroll through the content feed when the first content is presented further comprises determining the first scroll speed to scroll through the content feed when the first content is presented based at least in part on the reading speed of the user.

8. The method of claim 5, further comprising:
determining at least one device characteristic;
wherein determining the first scroll speed to scroll through the content feed when the first content is presented further comprises determining the first scroll speed to scroll through the content feed when the first content is presented based at least in part on the at least one device characteristic.

9. The method of claim 5, wherein the gesture sensitivity value increases based at least in part on a first increase in the rate of incoming content and a second increase in the number of unpresented relevant content, the method further comprising:
determining that the third content is relevant to the user;
determining a presentation length for presenting the third content based at least in part on the gesture; and
scrolling from the first content to the third content based at least in part on the gesture sensitivity value.

10. The method of claim 5, further comprising:
determining a first content category for the first content;
determining a second content category for the second content that is different than the first content category;
determining that the second content is irrelevant content;
determining that the third content is in the first content category; and
determining that the third content is relevant content.

11. The method of claim 5, further comprising:
determining a first user interaction with the first content;
determining that the first content is currently relevant content based at least in part on the first user interaction;
determining that the third content is related to the first content;
determining that the third content satisfies an information content density threshold; and
determining that the third content is relevant.

12. The method of claim 5, wherein the first content is a first product listing, the method further comprising:
determining product search results comprising a set of product listings, wherein the set of product listings includes the first product listing;
determining a current user interest based at least in part on a user interaction history over a time interval;
determining a relevance score for respective product listings in the set of product listings;
determining an order of the product search results based at least in part on the respective relevance scores; and
automatically scrolling through the product search results in the order.

13. The method of claim 5, further comprising:
determining an importance value for the first content;
determining an information content density for the first content;
determining a number of relevant content in the content feed;
determining a content type of the first content;
determining a length of time to present the first content based at least in part on at least one of the first relevance value, the importance value, the information content density, the number of relevant content, and the content type; and
reducing the first scroll speed to become zero such that the content feed is paused for at least a portion of the length of time.

14. The method of claim 5, further comprising:
determining user attributes associated with the user profile of the user;
wherein determining the relevance value for the first content comprises determining the relevance value for the first content based at least in part on the user attributes and the user interaction data.

15. The method of claim 5, wherein determining the first scroll speed to scroll through the content feed when the first content is presented comprises pausing the content feed for a predetermined length of time when the first content is presented.

16. A device comprising:
at least one memory that stores computer-executable instructions; and
at least one processor configured to access the at least one memory and execute the computer-executable instructions to:
determine a content feed comprising first content, second content, and third content for presentation at a user device;
determine user interaction data based at least in part on a user profile of a user;
determine an average browsing session length based at least in part on the user interaction data and a time of day;
determine a rate of incoming content to the content feed;
determine a first relevance value for the first content;
determine that the first content is relevant to a user account associated with the user of the user device based at least in part on the first relevance value;
determine a second relevance value for the second content;

determine that the second content is irrelevant based at least in part on the second relevance value;
determine a number of unpresented relevant content in the content feed;
determine a gesture sensitivity value based at least in part on the rate of incoming content and the number of unpresented relevant content, wherein the gesture sensitivity value increases based at least in part on a first increase in the rate of incoming content and a second increase in the number of unpresented relevant content, and wherein the gesture sensitivity value determines an amount of irrelevant content that is scrolled past when a gesture is detected;
determine a first scroll speed to scroll throuqh the content feed when the first content is presented by the user device, wherein the first scroll speed is determined based at least in part on the average browsing session length and the qesture sensitivity value;
determine a gesture; and
scroll based on the first scroll speed from the first content, skipping the second content, to the third content in response to the gesture based.

17. The device of claim 16, wherein the at least one processor is further configured to access the at least one memory and execute the computer-executable instructions to:
determine a topic of user interest in the content feed;
determine a set of one or more keywords associated with the topic;
determine a frequency of occurrence of respective keywords of the set of one or more keywords in the first content;
determine an information content density of the first content based at least in part on the frequency of occurrence of the respective keywords; and
determine a length of time to present the first content based at least in part on the information content density.

18. The device of claim 16, wherein the at least one processor is further configured to access the at least one memory and execute the computer-executable instructions to:
determine user attributes associated with the user profile of the user; and
determine a reading speed of the user based at least in part on the user attributes and the user interaction data;
wherein the at least one processor is configured to determine the first scroll speed to scroll through the content feed when the first content is presented by determining the first scroll speed to scroll through the content feed when the first content is presented based at least in part on the reading speed of the user.

* * * * *